United States Patent [19]

Viklund

[11] Patent Number: 6,101,079

[45] Date of Patent: Aug. 8, 2000

[54] CURRENT AND TRANSIENT VOLTAGE PROTECTOR

[75] Inventor: Mark Viklund, New Milford, Conn.

[73] Assignee: The Siemon Company, Watertown, Conn.

[21] Appl. No.: 09/209,379

[22] Filed: Dec. 10, 1998

Related U.S. Application Data

[60] Provisional application No. 60/068,993, Dec. 29, 1997.

[51] Int. Cl.[7] .................................................. H01C 7/12
[52] U.S. Cl. .......................... 361/119; 361/104; 361/111
[58] Field of Search ........................... 361/117–119, 111, 361/91.1, 93.1, 823, 824, 833–835, 837, 104, 93.8

[56] References Cited

U.S. PATENT DOCUMENTS

| Re. 35,030 | 8/1995 | Siemon et al. | 439/532 |
|---|---|---|---|
| 3,825,867 | 7/1974 | Georgopulos | 337/32 |
| 4,554,609 | 11/1985 | Ruehl et al. | 361/119 |
| 4,820,195 | 4/1989 | Siemon | 439/510 |
| 4,913,663 | 4/1990 | Siemon et al. | 439/509 |
| 4,924,345 | 5/1990 | Siemon et al. | 361/111 |
| 4,964,812 | 10/1990 | Siemon et al. | 439/403 |
| 4,968,264 | 11/1990 | Ruehl et al. | 439/622 |
| 5,341,269 | 8/1994 | Hayward et al. | 361/119 |
| 5,546,267 | 8/1996 | Frederiksen et al. | 361/119 |
| 5,555,153 | 9/1996 | Frederiksen et al. | 361/119 |

OTHER PUBLICATIONS

Anixer, AT&T Systimax Structure Cabling System, 1995 (No Month).
Graybar, Station Protection, ITW Linx, 1992 (No Month).
Graybar, Station Protection, Porta Systems Corp., 1992 (No Month).

*Primary Examiner*—Michael J. Sherry
*Attorney, Agent, or Firm*—Cantor Colburn LLP

[57] ABSTRACT

A current and transient voltage protector. The protector module for a wiring block having at least one wiring strip includes an insulative housing having opposed ends, at least four electrically conductive contacts defining a first contact, a second contact, a third contact, and a fourth contact partially disposed in the housing. The first contact and second contact extend through one of the ends and the third contact and fourth contact extend through the other end. The first contact and the third contact are aligned and the second contact and the fourth contact are aligned and adjacent to the first contact and the third contact. A first fuse is disposed in the housing and is electrically connected between the first contact and the third contact while a second fuse, also disposed in the housing, is electrically connected between the second contact and the fourth contact. In an alternative embodiment, two voltage surge suppressors are disposed in the housing with a first voltage surge suppressor being electrically connected to said third contact and a second voltage surge suppressor being electrically connected to said fourth contact. A ground contact is provided and is electrically connected to the first voltage surge suppressor and the second voltage surge suppressor.

18 Claims, 15 Drawing Sheets

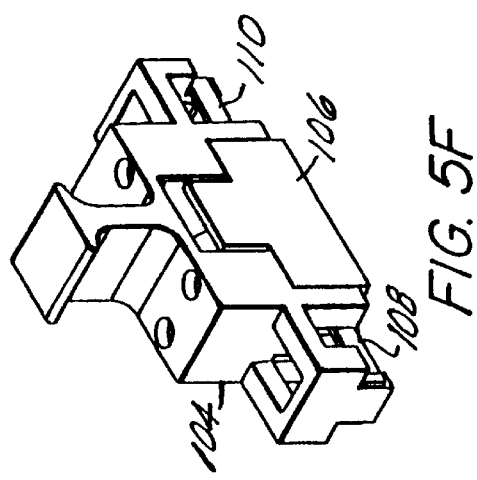
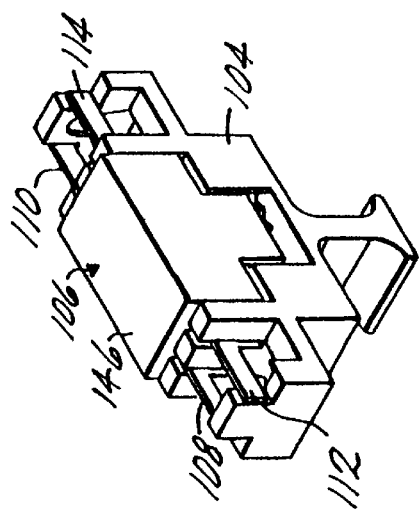
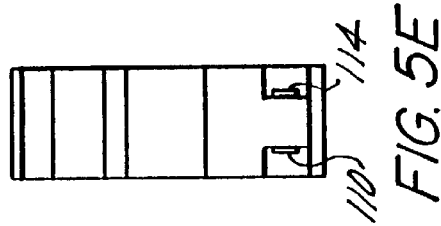
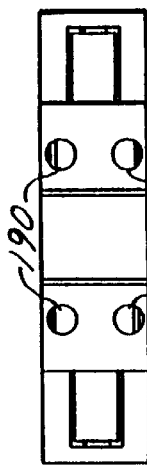
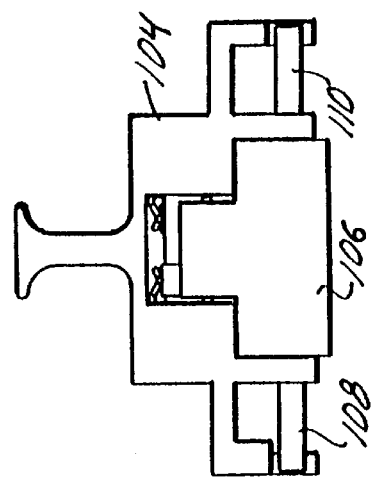
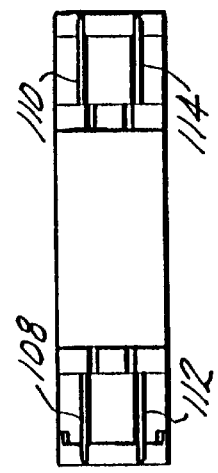
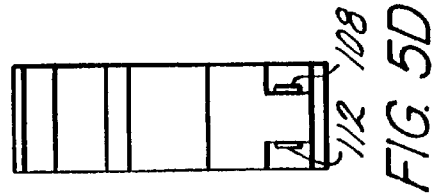

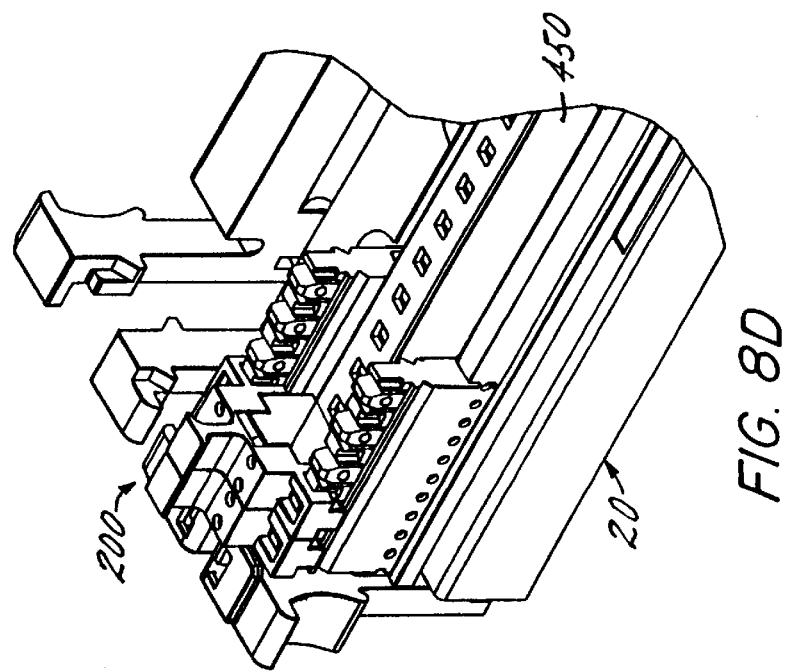
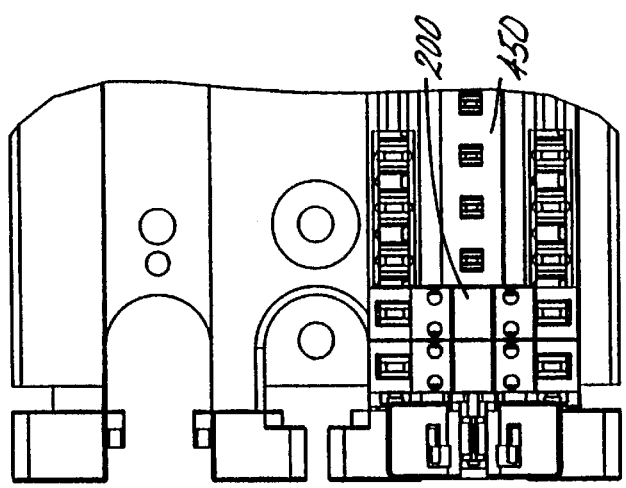
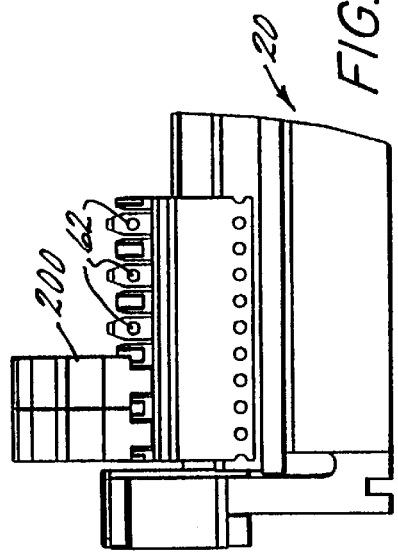
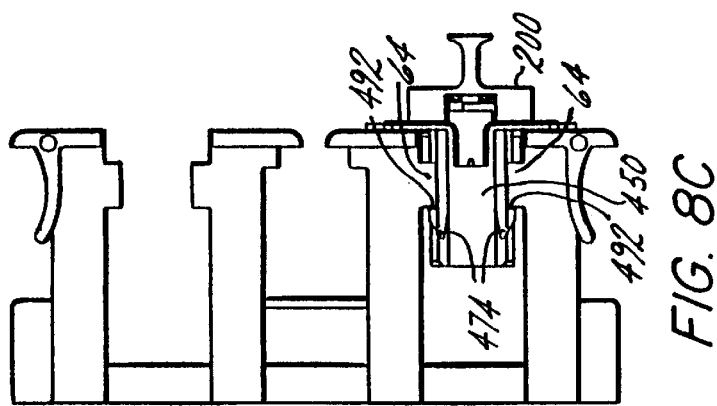
FIG. 8A
FIG. 8B
FIG. 8C
FIG. 8D

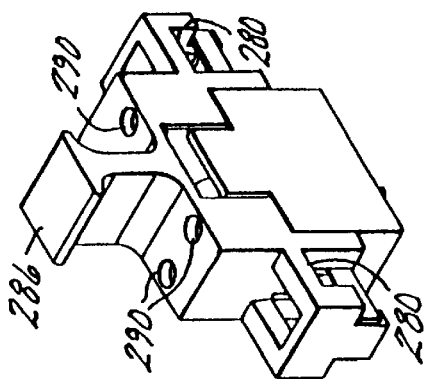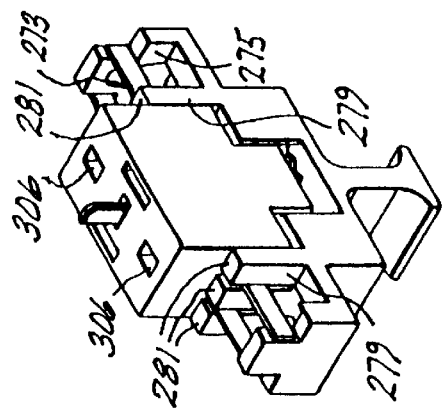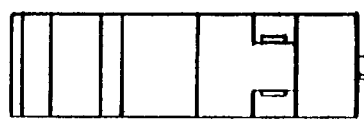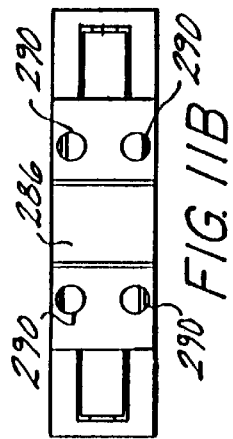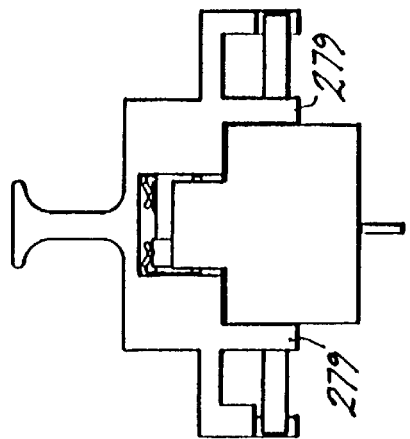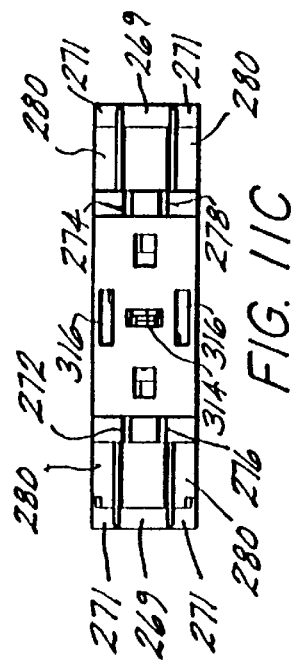

CURRENT AND TRANSIENT VOLTAGE PROTECTOR

CROSS-REFERENCE TO RELATED APPLICATIONS

This application claims the benefit of U.S. provisional patent application Ser. No. 60/068,993 filed Dec. 29, 1997.

BACKGROUND OF THE INVENTION

This invention relates generally to protector devices used in the communications industry. More specifically, this invention relates to a telecommunications protector device which provides protection against high current fluctuations and optionally transient voltages. The device of the present invention is adaptable to be inserted directly onto a wiring block having at least one wiring strip.

For many years, protection devices utilizing gas tube mechanisms have been used to protect telecommunications cables from high current fluctuations and transient voltage. Such "primary" protective devices are located at the juncture between outside lines and the lines leading into a building. It is increasingly desirable to protect low voltage telecommunications and data cables from high transient voltages at the terminal blocks wherein the connections are made between the primary protection devices and equipment inside the building. Protective devices of this type are sometimes known as "secondary" protectors. A secondary device is used with the primary device as a second line of defense against any surge currents transient voltage spikes that pass through the primary protection. Also, the secondary protection device is located as close as possible to the equipment connection point such that any transients generated between the building entrance and the main distribution point are clamped as well.

Wiring connections employing wire strips are well known and commercially available from AT&T Technologies such as the 110 connector system. The 110 type wiring systems are described in several patents, including U.S. Pat. No. Re. 35,030, U.S. Pat. Nos. 4,964,812, 4,118,095, 3,611,264 and 3,798,581, and generally include a wiring block having at least one wiring strip. Although there are currently many protection devices for use on 66 type connector blocks (an older wiring block system), such as the Siemon Pico Protector (U.S. Pat. No. 4,983,663) and others from ITW Linx, Porta Systems, and AT&T, there is a need for current and transient voltage protection on wiring blocks of the type having at least one wiring strip such as the above-described 110 connector.

Prior art devices that include sneak current protection for use with 110 style mounting bases lack test access and replaceable current protection devices. For example, a protection device currently made by AT&T (part# SCP-110 Block) for the 110 connector system provides only sneak current protection which does not provide test access or replaceable current protection elements. The prior art devices do not provide optional transient voltage protection. Thus there is a need in the industry for an improved telecommunications protector device for use on a wiring block having a wiring strip, such as the 110 connector system, which incorporates protection against high current fluctuations and optionally transient voltages while allowing for replaceable current protection elements and test access.

SUMMARY OF THE INVENTION

The above discussed and other drawbacks and deficiencies of the prior art are overcome or alleviated by the protector of the present invention. In accordance with the present invention, a current protector and a current/transient voltage protector are disclosed. The protector module for a wiring block having at least one wiring strip includes an insulative housing having opposed ends, at least four electrically conductive contacts defining a first contact, a second contact, a third contact, and a fourth contact partially disposed in the housing. The first contact and second contact extend through one of the ends and the third contact and fourth contact extend through the other end. The first contact and the third contact are aligned and the second contact and the fourth contact are aligned and adjacent to the first contact and the third contact. A first fuse is disposed in the housing and is electrically connected between the first contact and the third contact while a second fuse, also disposed in the housing, is electrically connected between the second contact and the fourth contact.

In an alternative embodiment, two voltage surge suppressors are disposed in the housing with the first voltage surge suppressor being electrically connected to said third contact and the second voltage surge suppressor being electrically connected to said fourth contact. A ground contact is provided and is electrically connected to the first voltage surge suppressor and the second voltage surge suppressor.

BRIEF DESCRIPTION OF THE DRAWINGS

Referring now to the drawings wherein the like elements are numbered alike in the several FIGURES:

FIG. 5A is a front view of the current protector;

FIG. 5B is a top view of the current protector; am

FIG. 5C is a bottom view of the current protector;

FIG. 5D is a left end view of the current protector;

FIG. 5E is a right end view of the current protector;

FIG. 5F is a perspective view of the current protector of FIG. 3;

FIG. 5G is a perspective view of the current protector of FIG. 3 with the device orientated upside down;

FIG. 8A is a front view of the current and voltage protector mounted to a prior art wiring block;

FIG. 8B is a top view of the current and voltage protector mounted to a prior art wiring block;

FIG. 8C is a left side view of the current and voltage protector mounted to a prior art wiring block;

FIG. 8D is a perspective view of the current and voltage protector mounted to a prior art wiring block;

FIG. 11A is a front view of the current and voltage protector of FIG. 7;

FIG. 11B is a top view of the current and voltage protector of FIG. 7;

FIG. 11C is a bottom view of the current and voltage protector of FIG. 7;

FIG. 11D is a left end view of the current and voltage protector of FIG. 7;

FIG. 11E is a right end view of the current and voltage protector of FIG. 7;

FIG. 11F is a perspective view of the current and voltage protector of FIG. 7;

FIG. 11G is a perspective view of the current and voltage protector of FIG. 7 with the device orientated upside down;

DETAILED DESCRIPTION OF PREFERRED EMBODIMENTS

Figure 1:
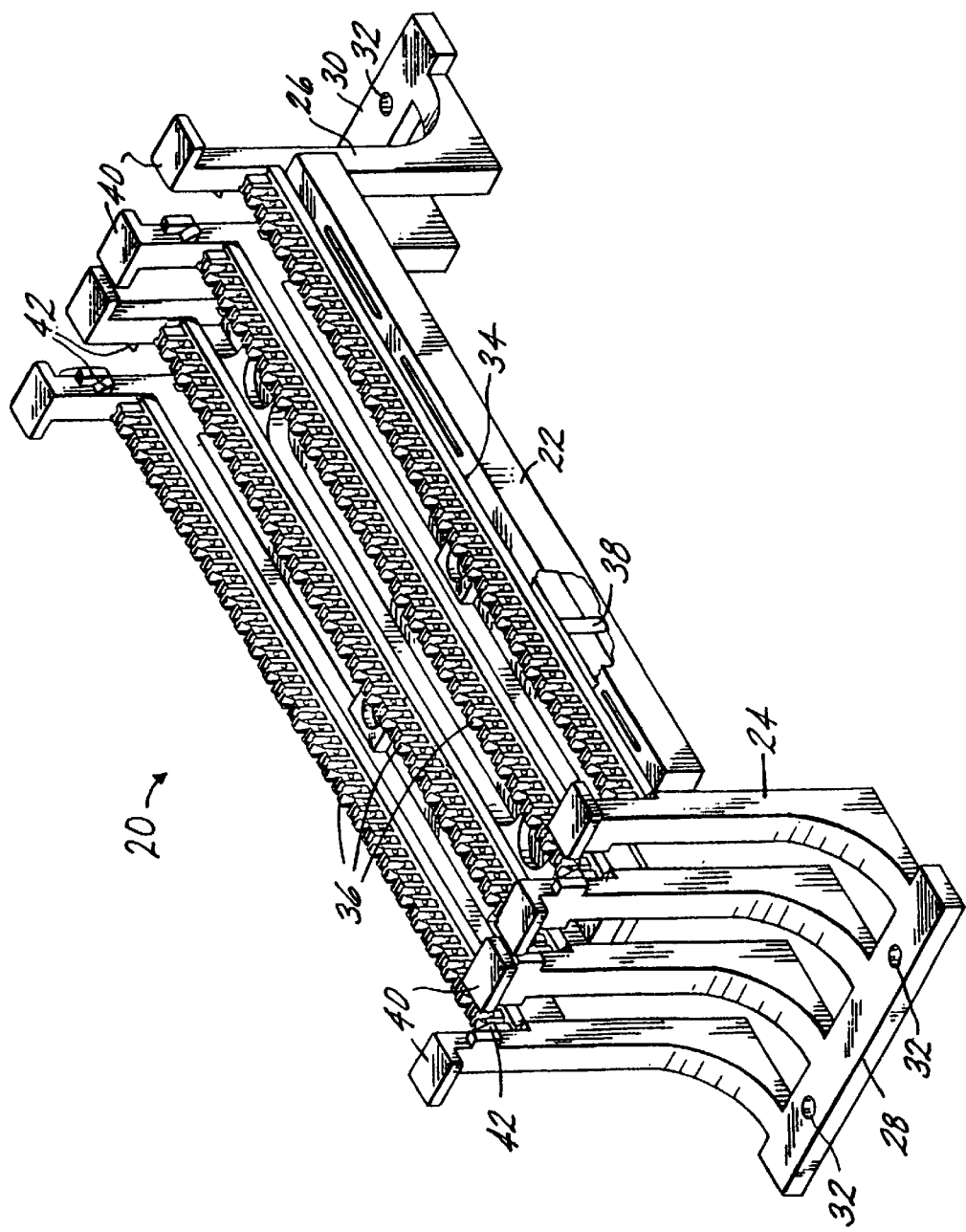
FIG. 1 is a perspective view of a 110 type connector block in accordance with the prior art.
Figure 2:
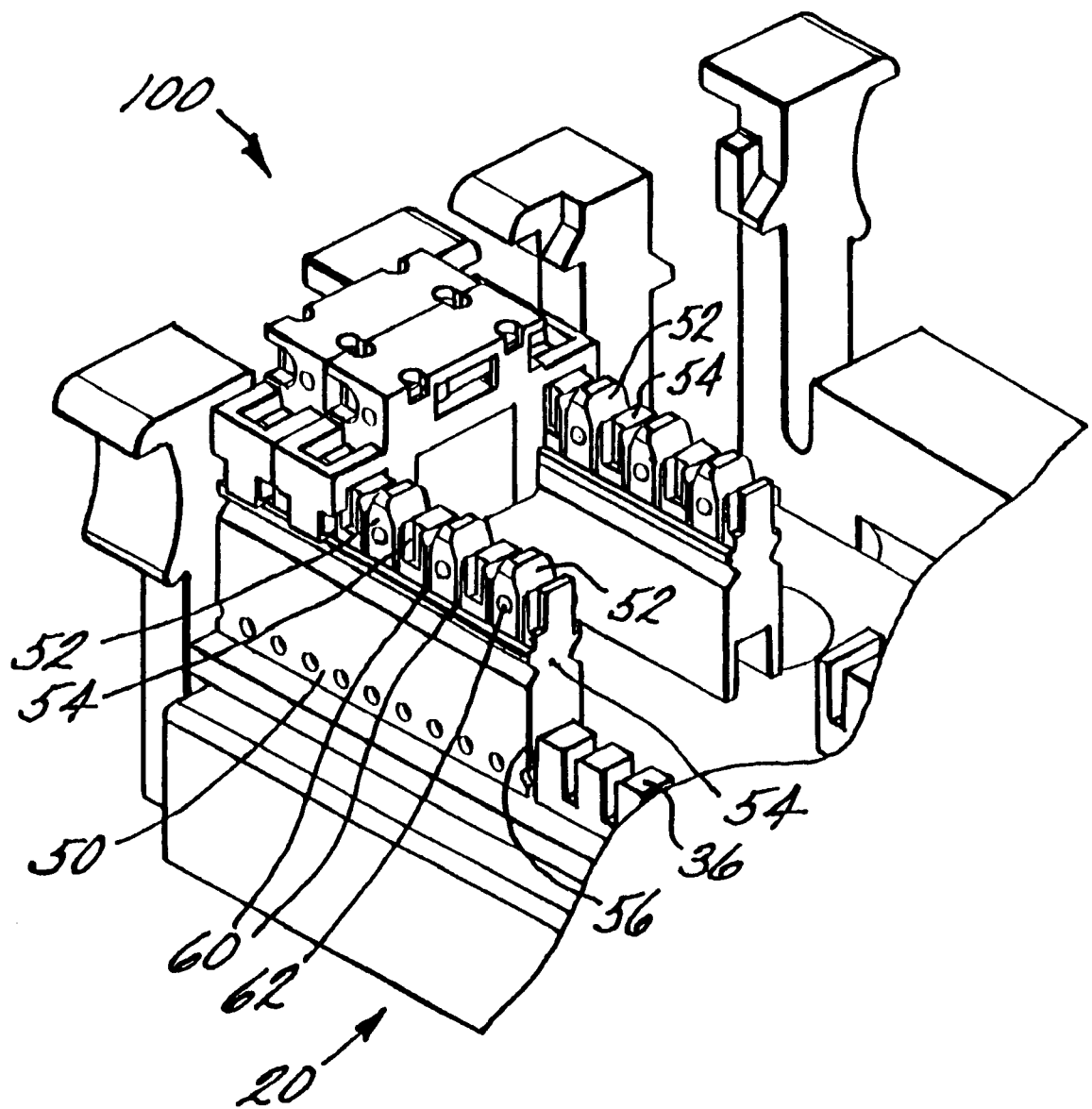
FIG. 2 is a perspective view of a current protector in accordance with the present invention mounted to a 110 type wiring block of the prior art.

Referring to FIG. 1 (prior art) and FIG. 2, an AT&T Technologies 110A type wiring block is shown generally at 20. Wiring block 20 comprises a base 22 having integrally molded or snap on legs 24 and 26 at each end thereof. Legs 24 and 26 provide a space behind wiring block 20 (when mounted) for cables that are to be terminated on wiring block 20. Further, legs 24 and 26 terminate at a mounting member 28 and 30, respectively, with each member having a plurality of mounting holes 32 therethrough. An upper surface 34 of base 22 has a plurality of longitudinal slots with spaced mounting holes through base 22. A wiring strip 36 is secured in each of the slots by a plurality of posts 38, extending from the lower surface of strip 36 through the mounting holes in the slots. Wiring strips 36 are generally parallel. Posts 38 snap into slots (not shown) on base 22 at its lower surface. Legs 24 and 26 extend upwardly past base 22 and terminate at platforms 40. Opposing surfaces of each outer pair of legs 24 and 26 include a retaining edge 42 for resiliently securing designation strips (not shown). Wire strips 36 have teeth with a wire receiving portion there between. Connector blocks 50 mount on wiring strips 36 and have teeth 52 and 54. Depending legs 56 receive wire strip 36 there between. Disposed within the space between teeth 52 and 54 are wire contacts 60. As is generally known in the art, wire contacts 60 are preferably insulation displacement contacts having forcations at each end to contact wires connected to the wire block at either the wire strip 36 or at connector block 50 (at the upper end of the insulation displacement, wire contact 60).

Figure 3:
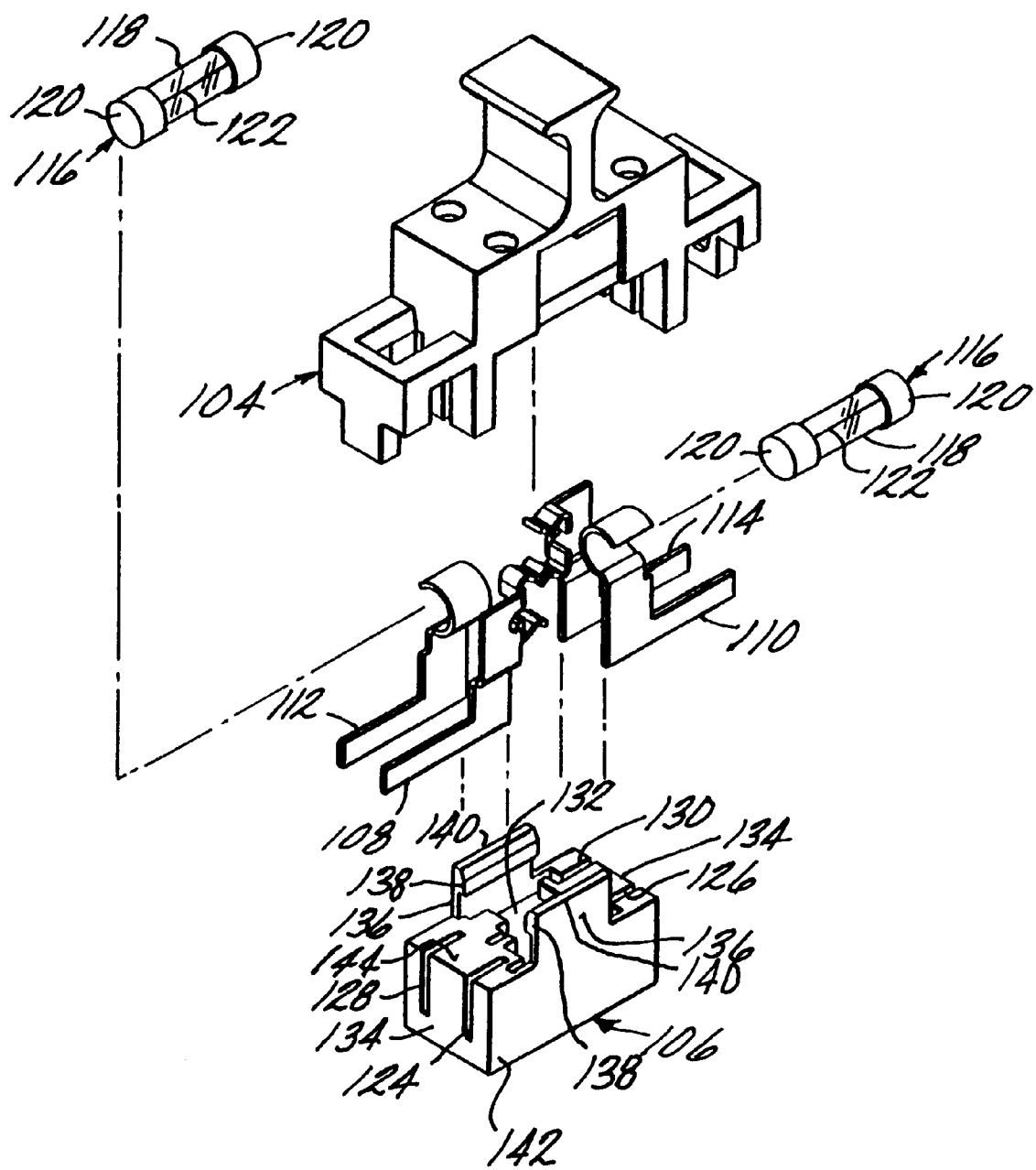
FIG. 3 is an exploded assembly view of the current protector.

Referring to FIGS. 2 and 3, a current protector mountable to connector blocks 50 on a wiring block 20 in accordance with the present invention is generally shown at 100. Current protector 100 includes an insulative, preferably plastic, housing comprising an upper housing portion 104 and a lower housing portion 106. Partially disposed within the housing are four contacts 108, 110, 112 and 114. Contacts 108 and 110 are essentially aligned and adjacent to contacts 112 and 114 which are also aligned. A first fuse element 116 of the type readily commercially available having a glass housing 118, terminal ends 120 and a metal filament 122 electrically connects contacts 108 and 110 and is retained by the geometries of contacts 108 and 110. A second and similar fuse element 116 electrically connects contacts 112 and 114 and is retained by the geometries of the contacts in a similar fashion. Aligned contacts 108 and 110 are spaced apart from adjacent aligned contacts 112 and 114 so as to mate with respective wire contacts 60 on connector blocks 50 in two different rows of wiring block 20. A predetermined current is applied across contacts 108 and 110, and 112 and 114, causes the metal filament 122 to break in conventional fashion to terminate the electrical connection between the contacts. It will be appreciated that the present invention is suitable for a variety of commercially available 110 type wiring blocks having at least one wiring strip.

Referring to FIG. 3, lower housing 106 is generally a rectangularly shaped box having a hollow interior 132 with slots 124, 126, 128, and 130 disposed at ends 134 which extend inward to receive contacts 108, 110, 112 and 114. Slot 124 receives contact 108, slot 126 receives contact 110, slot 128 receives contact 112, and slot 130 receives contact 114. Opposed resilient arms 136 having inwardly facing locking members 138 at the arm ends 140 extending upward from each side 142 and mate with upper housing 104, as described below, to engage the lower housing 106 with the upper housing 104. Slots 124 and 128 are spaced apart so that contacts 108 and 112 are matable with wire contacts 60 on a connector block 50. Slots 128 and 130 are similarly spaced so that contacts 110 and 114 are matable with wire contacts 60 on another connector block 50. Lower housing 106 has an upper surface 144 which rests against the upper housing 104. The precise configuration of interior chamber 132 may be varied so long as contacts 108, 110, 112, and 114 are disposed within the lower housing so that fuse elements 116 electrically connect contact 108 to contact 110, and contact 112 to contact 114, so that when protector 100 is mounted to a wiring block, contacts 108, 110, 112 and 114 are received within wire contacts 60 to make an electrical connection between respective connector blocks 50 through the fuse elements 116.

Figure 4:
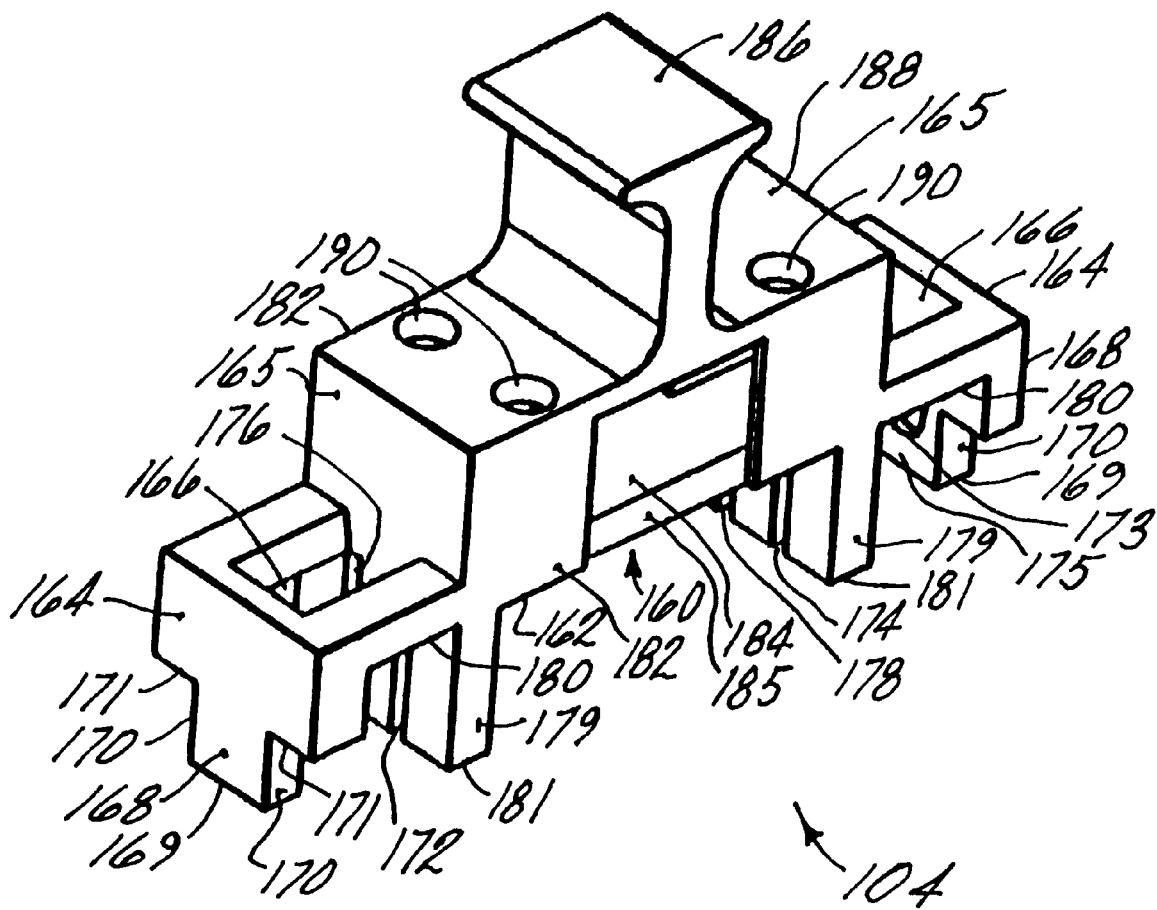
FIG. 4 is a perspective view of an upper housing of the current protector.

Referring to FIG. 4, upper housing 104 is a generally rectangular shaped box having a hollow interior 160 and an opening at its bottom 162 to receive contacts 108, 110, 112 and 114 and fuse elements 116. Upper housing 104 includes end extensions 164 extending from each end 165 which have rectangular openings 166 and depending legs 168. Legs 168 have opposed surfaces 170, notch surfaces 171 and bottom surfaces 169. Contacts 108, 110, 112 and 114 nestle against opposed surfaces 170 and slightly below notch surfaces 171. Upper housing 104 further includes slots 172, 174, 176 and 178 disposed in inner depending legs 179 which partially receive contacts 108, 110, 112 and 114. Slots 172, 174, 176, and 178 communicate with interior 160 so that contact 108 is partially retained in slot 172, contact 110 is partially retained in slot 174, contact 112 is partially retained in slot 176, and contact 114 is partially retained in slot 178. Slots 172, 174, 176, and 178 align with lower housing slots 124, 126, 128, and 130. Preferably, end extensions 164 define a lower surface 180 which is matable to connector block teeth 52 and 54 so that when current protector 100 is mounted to a wiring block 20, teeth 52 and 54 may be nestled against lower surface 180. Similarly, bottom end extension surface 169 and inner leg bottom surface 181 rest against a wiring block when protector 100 is mounted thereon. Each side 182 has a recessed latching surface 184 with a latching hub 185 matable with inwardly facing locking members 138 of arm ends 140 on lower housing 106. A recessed holding surface 173 is disposed on inner leg surface 175. Recess holding surface 173 receives bumps 62 (FIG. 2) disposed on connector block 50 to allow current protector 100 to snap fit onto connector block 50. Preferably upper housing 104 has a handle 186 disposed on its top 188 so that the current protector 100 may be easily removed from a wiring block when desired. It is also preferable to have test holes 190 disposed on top 188 and extending into upper housing 104 and in alignment with contacts 108, 110, 112 and 114 so that a test apparatus may be electrically connected to contacts 108, 110, 112 and 114 to determine whether fuse elements 116 are functioning properly.

Thus, as shown in FIGS. 5A–5G, the geometries of upper housing 104 and lower housing 106 retain contacts 108, 110, 112 and 114 and fuse elements 116 so that contact 108 is aligned with contact 110 and electrically coupled by fuse element 116 and so that contact 112 is aligned with contact 114 and electrically coupled by another fuse element 116. Lower housing bottom wall 146 encloses lower housing 106 (best seen in FIG. 5G). The respective electrically coupled contacts 108 and 110, and 112 and 114, are held in aligned and adjacent position by slots 124, 126, 128 and 130 of lower housing 106, and slots 172, 174, 176 and 178, as well as surfaces 170 of legs 168 of upper housing 104. The precise geometry of the housings 104 and 106 may be varied without departing from the spirit and scope of the present invention.

Figure 6:
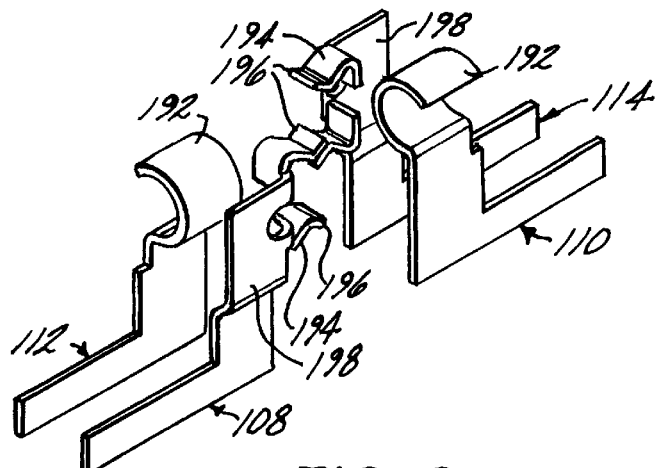
FIG. 6 is an exploded view of four contacts of the current protector of FIG. 3.

Referring to FIG. 6, contacts 108, 110, 112 and 114 comprise L shaped plate members. Contacts 110 and 112 have a C shaped upper portion 192 which faces inwardly to retain fuse 116 at one of its terminal ends 120. C-shaped upper portion is resilient so that fuse element 116 may be removably received therein. Contacts 108 and 114 have a U shaped upper portion 194 which face longitudinally inward and resiliently retain fuse elements 116 at the other terminal end 120 between forcations 196. Forcations 196 bend to resiliently retain terminal end 120 there between. Contacts 108 and 114 include recessed portions 198 to align U shaped portions 194 with C shaped portions 192. Contacts 108, 110, 112 and 114 are made of an electrically conductive material, preferably metal. In this manner, fuse elements 116 may be removable from contacts 108 and 110, and 112 and 114. Contacts 108, 110, 112 and 114 are retained within wire contacts 60 of connector block 50 when protector 100 is mounted to the wiring block.

Thus in use, when protector 100 is mounted to a wiring block, such as wiring block 20, if a load is applied across electrically coupled contacts 108 and 110, and/or 112 and 114, which exceeds a predetermined level, fuse elements 116 break the electrical connection. An operator may easily test the fuse elements 116 through test holes 190 and if an electrical connection has been broken, the operator merely removes current protector 100 from a wiring block by grasping handle 186. An operator can easily open protector 100 by urging apart resilient arms 136 to separate upper housing 104 from lower housing 106. A blown fuse element 116 is then removed from its respective contacts 108 and 110, and/or 112 and 114 and replaced.

Referring now to FIGS. 7 and 8A–8D, a current and transient voltage protector mountable to a wiring block in accordance with the present invention is generally shown at 200. Current and transient voltage protector 200 includes an insulative, preferably plastic, housing comprising an upper housing portion 204 and a lower housing portion 206. Partially disposed within each housing are four contacts 208, 210, 212 and 214. Contacts 208 and 210 are essentially aligned and adjacent to contacts 212 and 214 which are also aligned. A first fuse element 116 of the type previously described herein electrically connects contacts 208 and 210 and is retained by the geometries of contacts 208 and 210. A second and similar fuse element 116 electrically connects contacts 212 and 214 and is retained by the geometries of the contacts in a similar fashion. Aligned contacts 208 and 210 are spaced apart from adjacent aligned contacts 212 and 214. Disposed within upper housing 204 are two voltage suppressors 298 of the type readily commercially available. One suppressor 298 is electrically coupled to contact 210 and to a ground in the form of ground bus bar 450. The other suppressor is electrically connected to contact 214 and to ground bus bar 450. The suppressors 298 are electrically coupled to ground bus bar 450 by ground contact 300 which is disposed between suppressors 298 and retained in lower housing 206.

Thus, in a similar manner to protector 100, protector 200 is mounted to wiring block 20 so that aligned contacts 208 and 210, and 212 and 214, are received within the forcations of wire contacts 60 from one connector block 50 to respective wire contacts 60 on another connector block 50. A predetermined load applied across contacts 208 and 210, and 212 and 214, causes the metal filament 122 to break in conventional fashion to terminate the electrical connection between the contacts. If a transient voltage exceeding a predetermined level is detected at either contact 210 or 214, the voltage is grounded by suppressor 298 through ground contact 300.

Figure 9:
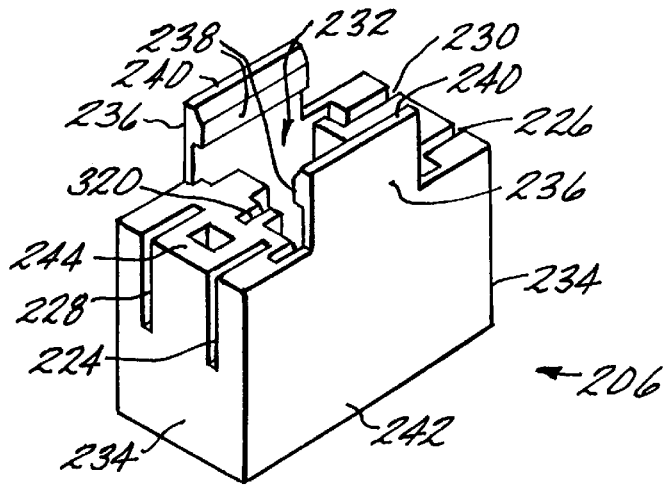
FIG. 9 is a perspective view of a lower housing of the current and voltage protector.
Figure 10:
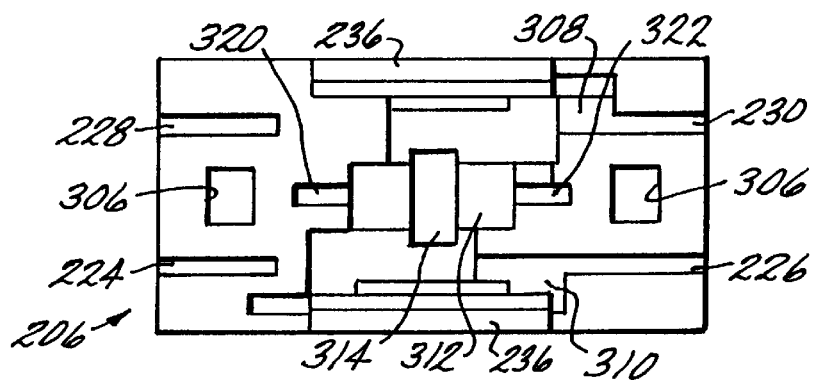
FIG. 10 is a top view of a lower housing of the current and voltage protector.
Figure 7:
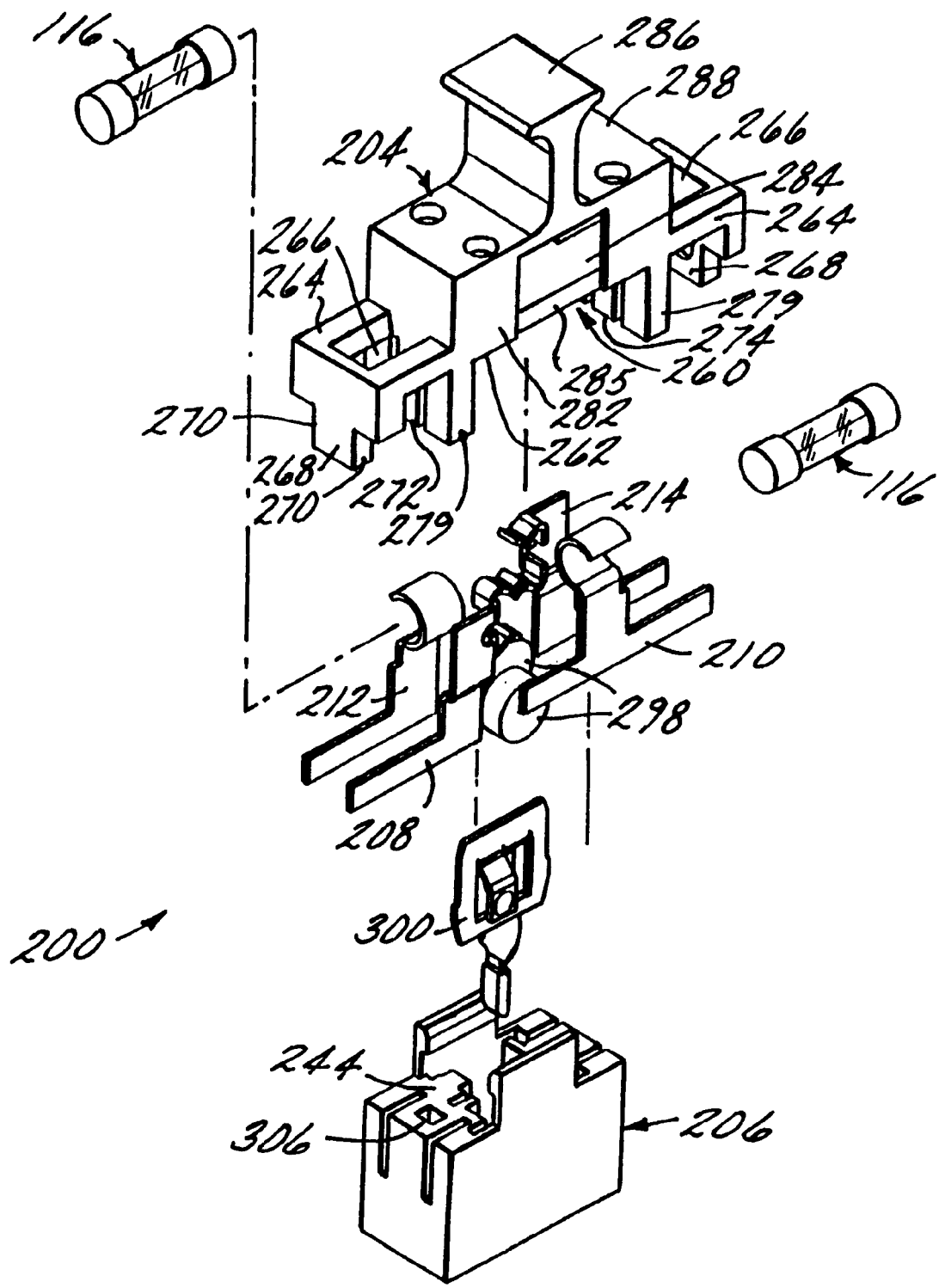
FIG. 7 is an exploded assembly view of a current and voltage protector in accordance with the present invention.

Referring to FIGS. 9–10, lower housing 206 is a generally rectangular box having hollow interior 232 with slots 224, 226, 228, and 230 disposed at ends 234 which extend inward to receive contacts 208, 210, 212 and 214. Slot 224 receives contact 208, slot 226 receives contact 210, slot 228 receives contact 212, and slot 230 receives contact 214. Two ground slots 320 and 322 are disposed in lower housing 206 to partially retain ground contact 300. Ground slot 320 is disposed between slots 224 and 228, and ground slot 322 is disposed between slots 226 and 230. Opposed resilient arms 236 having inwardly facing locking members 238 at the arm ends 240 extend upward from each side 242 and mate with upper housing 204, as described below, to engage the lower housing 206 with the upper housing 204. Slots 224 and 228 are spaced apart so that contacts 208 and 212 are matable with wire contacts 60 on connector block 50. Slots 228 and 230 are similarly spaced so that contacts 210 and 214 are matable with wire contacts 60 on another connector block 50. Lower housing 206 has an upper surface 244 which rests against the upper housing 204. Lower housing further includes square shaped openings 306 disposed therethrough. Slot 230 extends to an expanded slot portion 308 for receiving contact 214. Slot 226 also extends to an expanded slot portion 310 for receiving contact 210. Lower housing 206 includes a lower wall portion 312 having a generally central rectangular opening 314 communicating with interior 232 through which ground contact 300 extends therethrough. Lower wall portion 312 also includes rectangular openings 316 which communicate with interior 232 disposed on each side of central opening 314 (As seen in FIGS. 11C and 11G).

The precise configuration of interior 232 may be varied so long as contacts 208, 210, 212, and 214 are disposed within the lower housing so that fuse elements 116 electrically connects contact 208 to 210, and contact 212 to 214, so that the contacts are received within wire contacts 60 to make an electrical connection between respective connector blocks 50 through the fuse elements 116, and so that one voltage suppressor 298 contact is electrically coupled to contact 210 and to ground bus bar 450 and the other suppressor 298 is electrically connected to contact 214 and to ground bus bar through ground contact 300 which is disposed between suppressors 298 and retained in upper housing 204.

Referring again to FIGS. 7, and 11A–11G, upper housing 204 has a generally hollow interior 260 opening at its bottom 262 to receive contacts 208, 210, 212 and 214, ground contact 300, voltage suppressors 298 and fuse elements 116. Upper housing includes end extensions 264 which have rectangular openings 266 and depending legs 268. Legs 268 have opposed vertical surfaces 270, notch surfaces 271, and bottom surfaces 269. Contacts 208, 210, 212 and 214 nestle against opposed surfaces 270 and slightly below notch surfaces 271. Upper housing 204 further includes slots 272, 274, 276 and 278 disposed in inner depending legs 279 which partially receive contacts 208, 210, 212 and 214. Slots 272, 274, 276, and 278 communicate with interior 260 so that contact 208 is partially retained in slot 272, contact 210 is partially retained in slot 274, contact 212 is partially retained in slot 276, and contact 214 is partially retained in slot 278. Slots 272, 274, 276, and 278 align with lower housing slots 224, 226, 228, and 230. Preferably, end extensions 264 have a lower surface 280 which is matable to connector block teeth 52 and 54 so that when current protector 200 is mounted to a wiring block 20, teeth 52 and 54 of the connector block 50 may be nestled against lower surface 280. Similarly, bottom end extension surface 269 and inner leg bottom surface 281 rest against connector block 50 when protector 200 is mounted thereon. Each side 282 has a recessed latching surface 284 with a latching nub 285 matable with inwardly facing locking members 238 of arm ends 240 on lower housing 206. A recessed holding surface 273 is disposed on inner leg surface 275. Recess holding surface 273 receives bumps 62 (FIG. 2) disposed on connector block 50 to allow protector 200 to snap fit onto connector block 50. Preferably upper housing 204 has a handle 286 disposed on its top 288 so that protector 200 may be easily removed from a wiring block when desired. It is also preferable to have test holes 290 disposed on top 288 and extending into upper housing 204 and in alignment with contacts 208, 210, 212 and 214 so that a test apparatus may be electrically connected to contacts 208, 210, 212 and 214 to determine whether fuse elements 116 are functioning properly.

Figure 12:
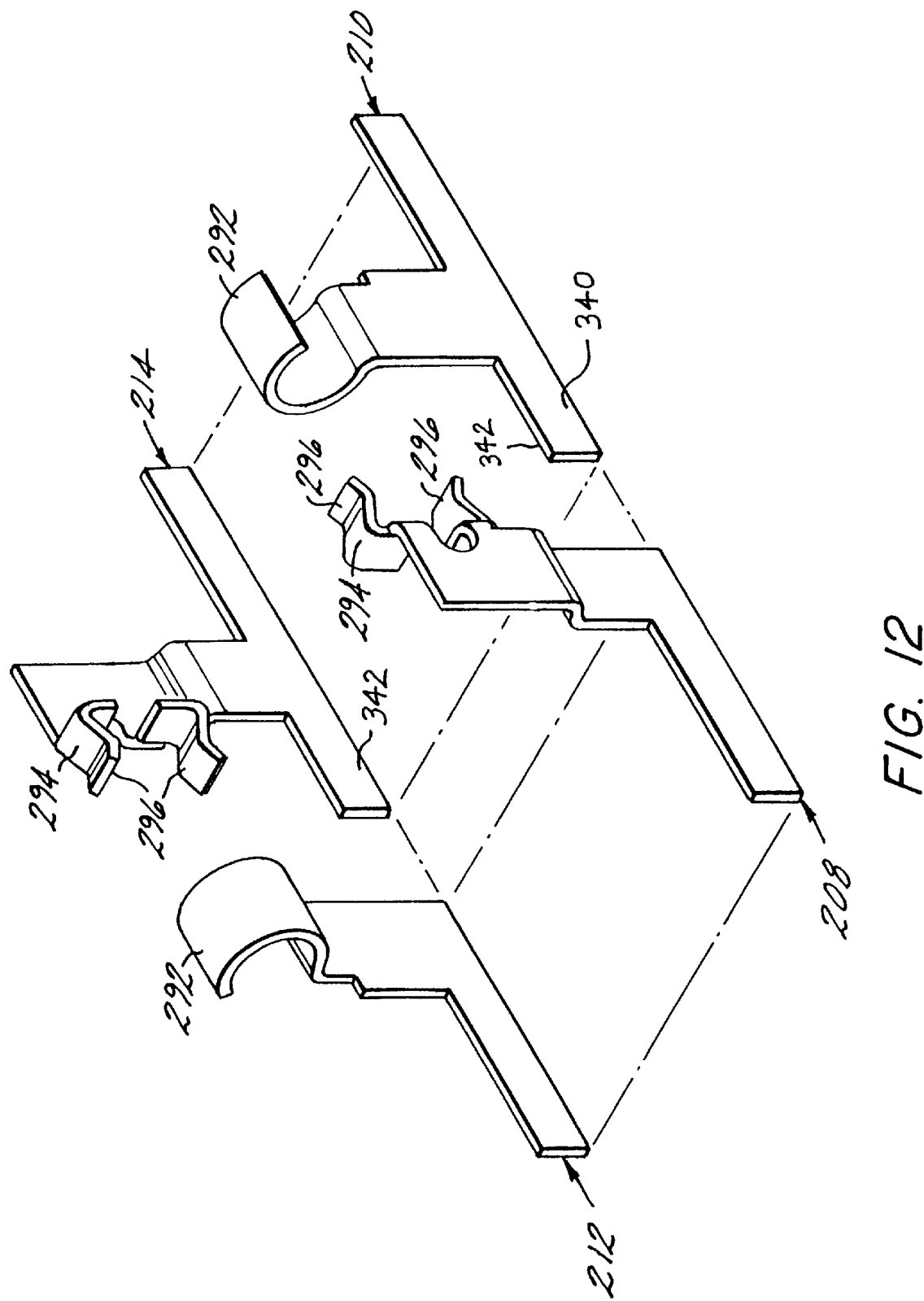
FIG. 12 is an exploded view of four contacts of the current and voltage protector of FIG. 7.

Referring to FIG. 12, contacts 208 and 212 comprise L shaped plate members. Contacts 210 and 214 comprise inverted T shaped members. Contacts 210 and 212 have C shaped upper portions 292 which faces inwardly to retain fuse 116 at one of its terminal ends 120. C-shaped portion is resilient so that fuse element 116 may be removably received therein. Contacts 208 and 214 have U shaped upper portions 294 which face longitudinally inward and resiliently retain fuse elements 116 at the other terminal end 120 between forcations 296. Forcations 296 bend to resiliently retain fuse elements 116 at a terminal end 120. Contacts 210 and 214 each further include a retaining portion 340 having a contact surface 342. Each C shaped portion 292 is aligned with a respective U shaped portion 294 so that fuse element 116 is retained therebetween. Voltage suppressor 298 is in surface contact with contact surface 342. Contacts 208, 210, 212 and 214 are made of an electrically conductive material, preferably metal.

Figure 13:
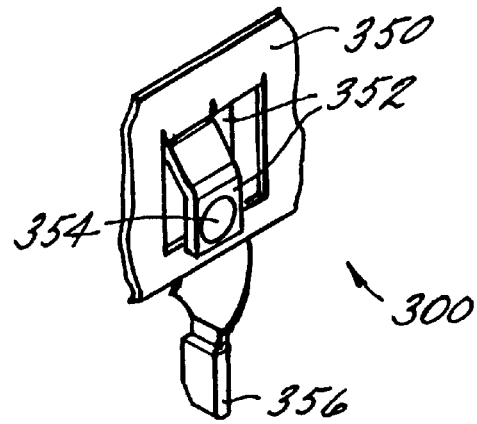
FIG. 13 is a perspective view of a ground contact of the current and voltage protector of FIG. 7.

Referring to FIG. 13, ground contact 300 is made of a conductive metal and includes a generally rectangular plate body 350 having two outwardly extending central tabs 352. Tabs 352 are adjacent to each other and include contact surfaces 354 which are in surface contact to one side of voltage suppressor 298. Tabs 352 are resilient to urge voltage suppressors 298 at their opposite side against respective contacts 210 and 214. In this manner voltage suppressors 298 are retained in interior 260 by the contact of tabs 352 which urge suppressors against respective contacts 210 and 214 (at surface 342 of contacts 210 and 214). Ground contact further includes a twisted tip 356 which extends through central opening 314 for insertion into ground bus bar 450. Ground contact 300 is retained in lower housing 206, between contacts 208, 210, 212 and 214 by insertion into opposed slots 320 and 322.

Referring to FIGS. 14–15A–15D, ground bus bar 450 includes a U shaped insulative frame 452 having a longitudinal axis with connecting portions 454 disposed at each end 456. Connecting portions 454 are also U shaped and have upper surfaces 458 having openings 460 thereon. Openings 460 are generally rectangularly shaped and converge with slots 462 on walls 464 and 466. Walls 464,466, and 468 form a channel 470. Wall 468 has a cut out portion 472. Latching fingers 474 are disposed on each side 476 of connecting portion 454 and are resilient. Frame 452 has a plurality of spaced apart ribs 478. Disposed within channel 470 are bus receiving clips 480. Bus 450 includes a bar 484 having a plurality of clips 486 disposed thereon which receive tips 356 of ground contacts 300. Attached to each end 488 of bar 484 is a bar securing clip 490 which is frictionally engaged within bus receiving clips 480. As shown in FIG. 8C, ground bus bar 450 may be attached to a wiring block, such as wiring block 20, by the contact of latching surfaces 492 of latching fingers 474 against post nubs 64. Ground bus bar 450 may also include a cover 494 having a plurality of aligned rectangular openings 496. Thus, when ground bus bar 450 is mounted to a wiring block, such as wiring block 20, openings 496 are aligned so that tips 356 received through rectangular openings 496 into clips 486 when protector 200 is mounted to wiring block 20.

Thus in use, a ground bus bar 450 is attached to a wiring block by locking latching fingers 474 to post nubs 64 to secure ground bus bar 450 to the wiring block 20. Protector 200 is then mounted to wiring block 20. If a current is applied across electrically coupled contacts 208 and 210, and/or 212 and 214, which exceeds a predetermined level, fuse elements 116 break the electrical connection. An operator may easily test the fuse elements 216 through test holes 290 and if an electrical connection has been broken, the operator merely removes protector 200 from the wiring block by grasping handle 286. An operator can easily open housing 202 by urging apart resilient arms 236 to separate upper housing 204 from lower housing 206. A blown fuse element 116 is then removed from its respective contacts 208 and 210, and/or 212 and 214. If a transient voltage exceeding a predetermined level is detected at either contact 210 or 214, the voltage suppressor 298 grounds the transient voltage through ground contact 300 which is electrically coupled to ground bus bar 450. In this manner, both sneak currents and transient voltages are protected by protector 200.

Figure 18:
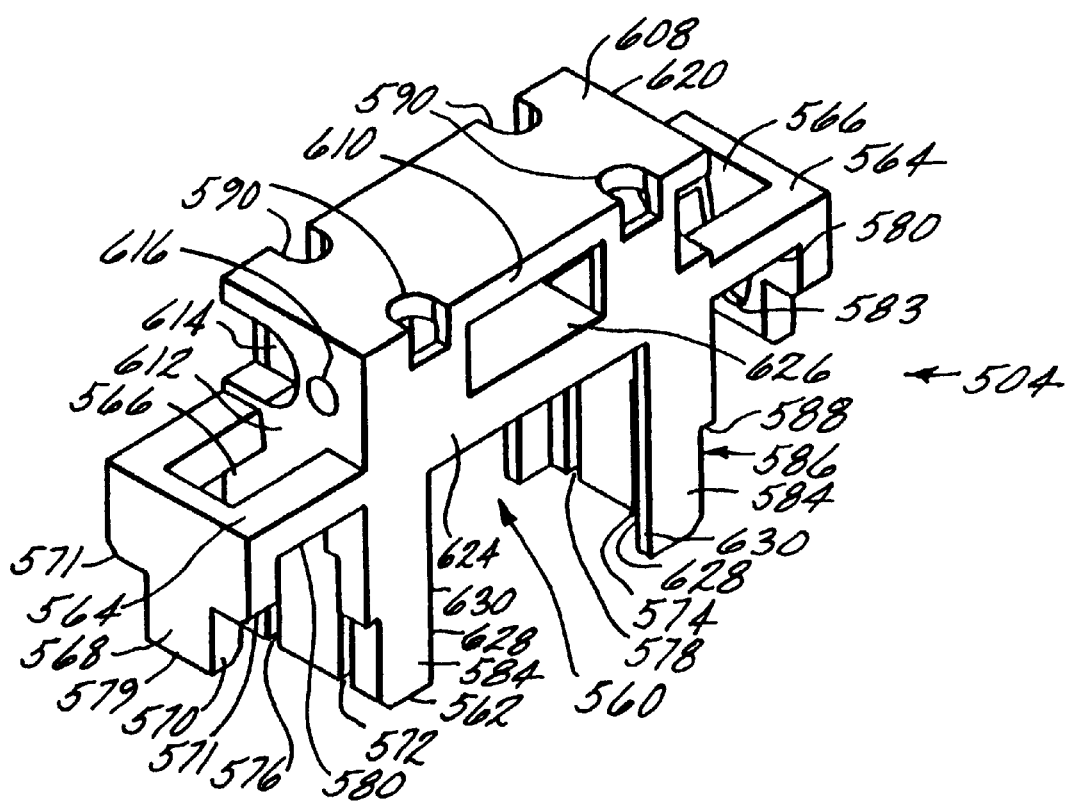
FIG. 18 is a perspective view of an upper housing of the current and voltage protector of FIG. 16.
Figure 14:
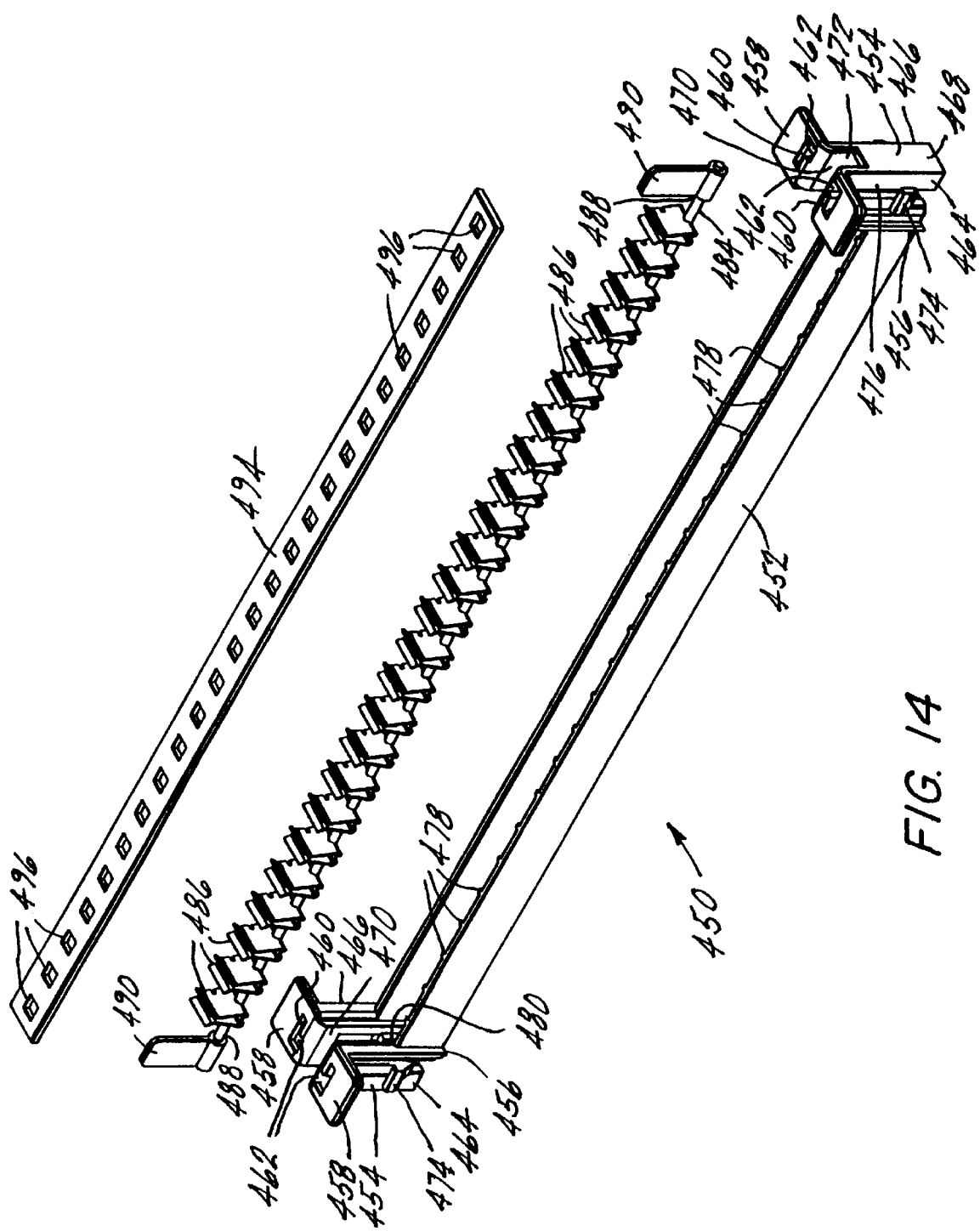
FIG. 14 is an exploded assembly view of the bus bar ground kit in accordance with the present invention.
Figure 15:
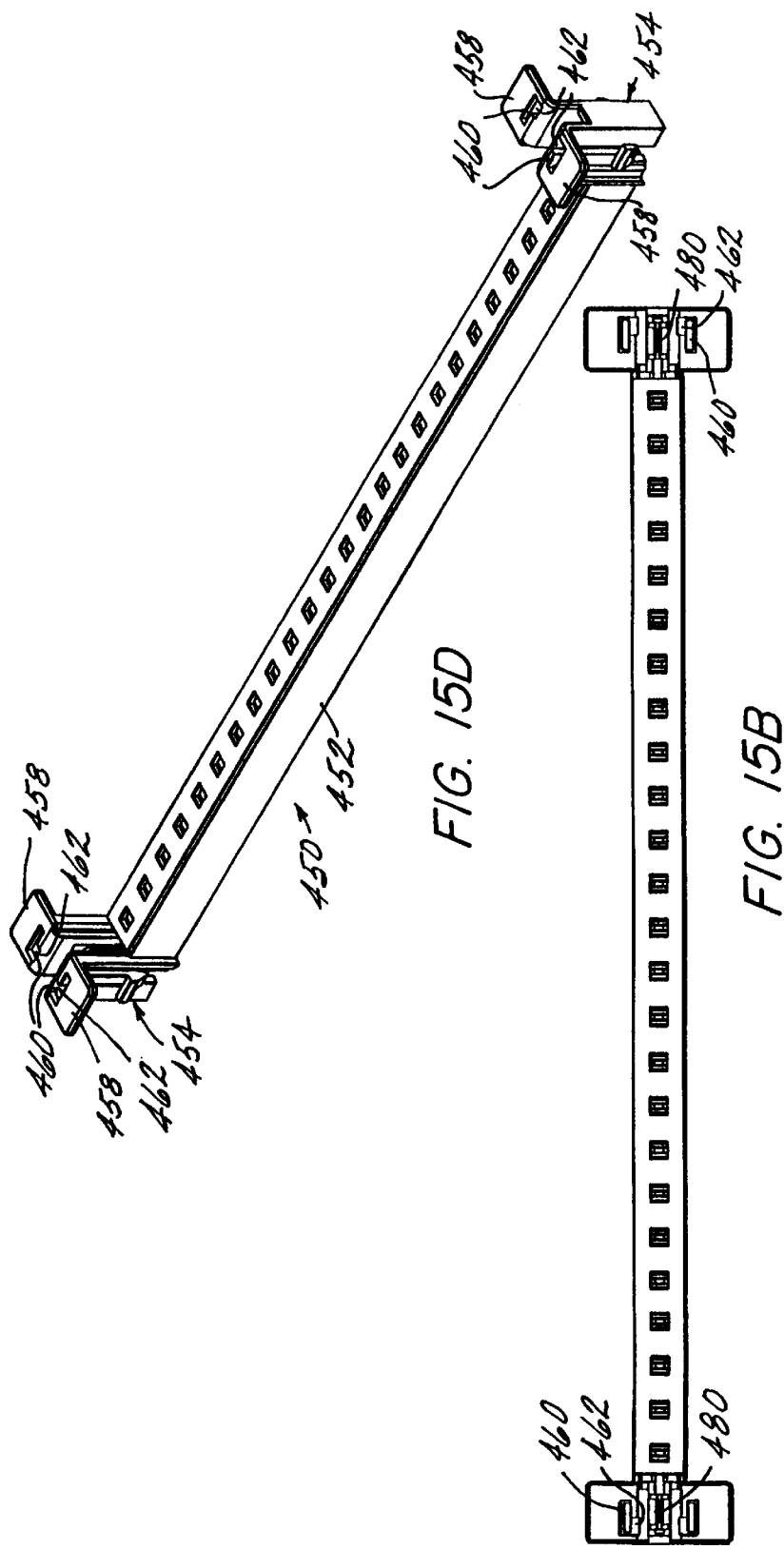
FIG. 15A is a front view of the bus bar ground kit of FIG. 11.
FIG. 15B is a top view of the bus bar ground kit of FIG. 11.
FIG. 15C is a left end view of the bus bar ground kit of FIG. 11.
FIG. 15D is a perspective view of the bus bar ground kit of FIG. 11.
Figure 16:
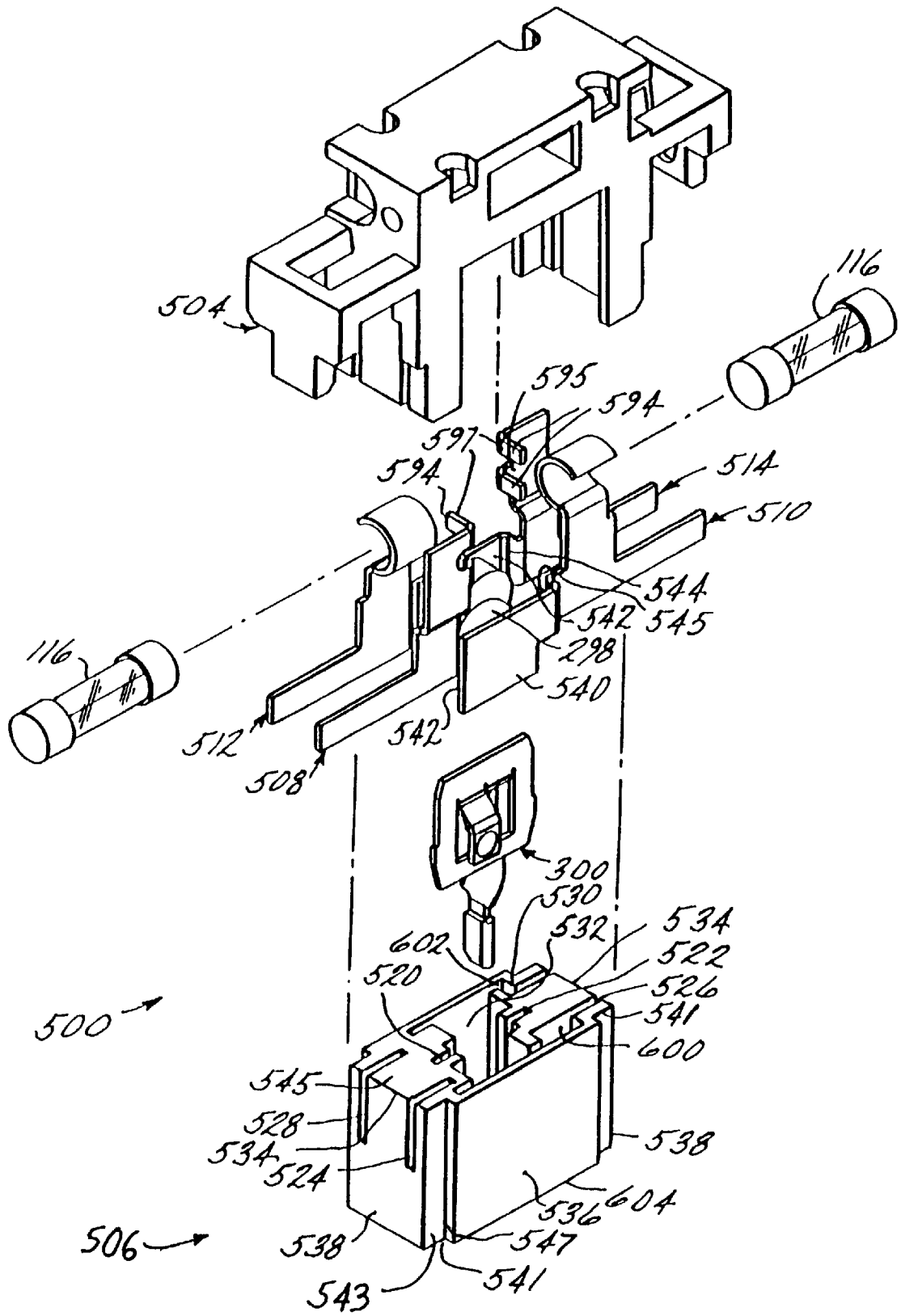
FIG. 16 is an exploded assembly view of an alternative embodiment of a current and voltage protector in accordance with the present invention.
Figure 17:
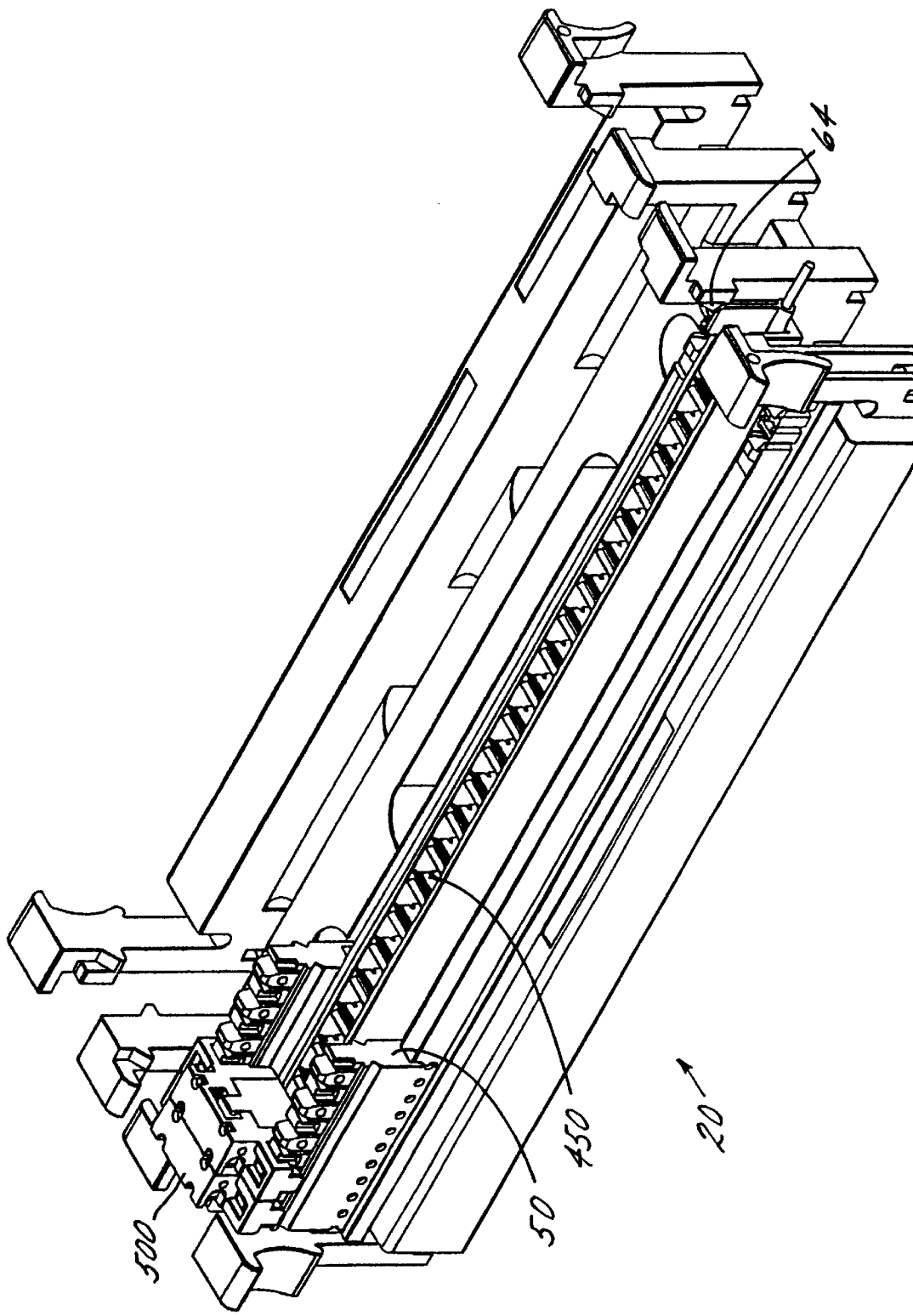
FIG. 17 is an exploded perspective view of the current and voltage protector of FIG. 16 mounted onto a wiring block.

Referring now to FIGS. 16–18, another embodiment of a current and transient voltage protector mountable to a wiring block in accordance with the present invention is generally shown at 500. Current and transient voltage protector 500 includes an insulative, preferably plastic, housing comprising an upper housing portion 504 and a lower housing portion 506. Partially disposed within each housing are bar contacts 508, 510, 512 and 514. It will be appreciated that contacts 508, 510, 512 and 514, fuse elements 116, voltage suppressors 298, ground contact 300 and ground bus bar 450 function as the like elements of protector 200 described above. Contacts 508, 510, 512 and 514 of this embodiment have a different geometric configuration. Contacts 508 and 512 comprise L shaped plate members. Contacts 510 and 514 comprise inverted T shaped plate members. Contacts 510 and 512 have upper C shaped portions 592 which faces inwardly to retain fuse 116 as discussed above. Contacts 508 and 514 have upper retaining fingers 594 with a space 595 therebetween which face longitudinally inward. Fuses 116 rest against the inward facing side 597 of retaining fingers 594. Contacts 510 and 514 each further include a lateral retaining portion 540 which extends outward having a contact surface 542 and a suppressor edge surface 544 disposed on the inner end 545 of its respective T shape. Voltage suppressor 298 nestles against edge surface 544 and is in surface contact with contact surface 542. Ground contact 300 is disposed between suppressors 298 which are inward of contact surfaces 542.

Lower housing 506 has a generally hollow interior 532 with slots 524, 526, 528, and 530 disposed at ends 534 which extend inward to receive contacts 508, 510, 512 and 514. Slot 524 receives contact 508, slot 526 receives contact 510, slot 528 receives contact 512, and slot 530 receives contact 514. Ground slots 520 and 522 retain ground contact 300 in a similar fashion as protector 200. Lower housing 506 includes side walls 536 and end walls 538. A groove 541 having surfaces 543 and 547 is provided at the intersection of side walls 536 and end walls 538. Lower housing 506 has an upper surface 545 which rests against the upper housing 504. Slot 526 extends to an expanded slot portion 600 for receiving contact 510. Slot 530 also extends to an expanded slot portion 602 for receiving contact 514. Lower housing 506 includes a lower wall portion 604 having a generally central rectangular opening (not shown) communicating with interior 532 through which ground contact 300 extends therethrough (not shown).

Referring to FIG. 18, upper housing 504 has a generally hollow interior 560 opening at its bottom 562 to receive contacts 508, 510, 512 and 514, ground contact 300, voltage suppressors 298 and fuse elements 116. Upper housing 504 includes end extensions 564 which have rectangular openings 566 and depending legs 568. Legs 568 have opposed vertical surfaces 570, notch surfaces 571, bottom surface 579. Contacts 508, 510, 512 and 514 nestle against opposed surfaces 570 slightly below notch surfaces 571. Upper housing 504 further includes slots 572, 574, 576 and 578 disposed on depending inner legs 584 which include notches 586 with surfaces 588. Surface 588 on each inner leg 584 nestles against connector block 50 as shown in FIG. 17. Slots 572, 574, 576, and 578 communicate with interior 560 so that contact 508 is partially retained in slot 572, contact 510 is partially retained in slot 574, contact 512 is partially retained in slot 576, and contact 514 is partially retained in slot 578. Slots 572, 574, 576, and 578 align with lower housing slots 524, 526, 528, and 530. Preferably, ends 564 have define a lower surface 580 which is matable to block teeth 56 and 58 so that when current protector 500 is mounted to a connector block 50, teeth 52 and 54 may be nestled against lower surface 580. Bottom surfaces 579 rest against wiring block 20. A recessed holding surface 583 is provided on the inner side of leg 568 to receive bumps 62 (FIG. 2) on the connector block 50.

Test holes 590 disposed on top 608 are formed on edges 610 of top 608 and are generally semicircular and in alignment with contacts 508, 510, 512 and 514 so that a test apparatus may be electrically connected to contacts 508, 510, 512 and 514 to determine whether fuse elements 116 are functioning properly. End wall 612 includes a fuse exit hole 614 so that a fuse may be removed from protector 500 without disassembling housing 502. End wall 612 has an access hole 616 so that fuse 116 can be pushed out of a similar fuse exit hole on end wall 620. End wall 620 has a similar exit hole. Side walls 624 have rectangular openings 626 so that fuse elements 116 may be viewed. Side walls 624 have a cut out portion 628 which is matable with side walls 536 and grooves 541 of lower portion 506. Side wall opening edges 630 engage grooves 540 when lower housing 506 and upper housing 504 are assembled.

Thus in use, a ground bus bar 450 is attached to a wiring block by locking latching fingers to post nubs 64 to secure ground bus bar 450 to the wiring block 20. Protector 500 is then mounted to wiring block 20 at connector blocks 50. If a load is applied across electrically coupled contacts 508 and 510, and/or 512 and 514, which exceeds a predetermined level, fuse elements 116 break the electrical connection. An operator may easily test the fuse elements 116 through test holes 590 and if an electrical connection has been broken, the operator merely removes protector 500 from the wiring block and inserts a tool or prod through hole 616 or 622 to push fuse 116 out its respective fuse exist hole 614 or 618 without separating upper housing 504 and lower housing 506. If a transient voltage exceeding a predetermined level is detected at either contact 510 or 514, the voltage suppressor 298 grounds the transient voltage through ground contact 300 which is electrically coupled to ground bus bar 450. In this manner, both sneak currents and transient voltages are protected by protector 500.

While the preferred embodiments have been shown and described, various modifications and substitutions may be made without departing from the spirit and scope of the invention. Accordingly, it is to be understood that the present invention has been described by way of illustration and not by limitation.

What is claimed is:

1. A protector module for a wiring block having at least one wiring strip comprising:

an insulative housing having opposed ends, said housing comprising a plurality of test holes;

at least four electrically conductive contacts defining a first contact, a second contact, a third contact, and a fourth contact, said contacts being partially disposed in said housing, said first contact and said second contact extending through one of said ends, said third contact and said fourth contact extending through the other of said ends, said first contact and said third contact being aligned, said second contact and said fourth contact being aligned and adjacent to said first contact and said third contact;

a first fuse in said housing, said first fuse being electrically connected between said first contact and said third contact, and wherein said first fuse is accessible through a first pair of said test holes; and a second fuse in said housing, said second fuse being electrically connected between said second contact and said fourth contact, and wherein said second fuse is accessible through a second pair of said test holes;

wherein said wiring block is a 110 type wiring block having two rows of connector blocks, said first contact and said second contact being matable with a connector block in a first row and said third contact and said fourth contact being matable with a connector block in a second row.

2. A protector module according to claim 1, wherein said housing includes a bottom; and further comprising:

a first voltage surge suppressor electrically connected to said third contact and a second voltage surge suppressor being electrically connected to said fourth contact; and a ground contact, said ground contact being electrically connected to said first voltage surge suppressor and said second voltage surge suppressor, said ground contact having a distal end extending through said bottom.

3. A protector module according to claim 2, further comprising:

opposed resilient tabs, said tabs outwardly extending from said ground contact; one of said tabs urging said first voltage surge suppressor against said third contact, and the other of said tabs urging said second voltage surge suppressor against said fourth contact.

4. A protector module according to claim 1, wherein:

said first contact and said third contact are parallel to said second contact and said fourth contact.

5. A protector module according to claim 1, wherein:

said housing includes four slots, two of said slots being disposed on one of said ends and receiving said first and said second contacts, the other two of said slots being disposed on the other of said ends and receiving said third and said fourth contacts.

6. A protector module according to claim 1, wherein:

said housing comprises an upper housing portion and a lower housing portion;

said lower housing portion includes opposed upwardly extending resilient arms, each of said arms having a latching surface thereon; and said upper housing portion includes opposed recessed surfaces for defeatably engaging said latching surfaces.

7. A protector according to claim 1, wherein:

said housing further includes an extending portion depending from each end, one of said extending portions retaining said first contact and said second contact in spaced apart and parallel relationship, the other of said extending portions retaining said third contact and said fourth contact in spaced apart and parallel relationship.

8. A protector according to claim 1, wherein:

said housing further includes two holes, one of said holes being aligned with said first and said third contacts, the other said hole being aligned with said second and said fourth contacts, whereby said first fuse and said second fuse may be removably inserted into said housing through said holes.

9. A protector module for a wiring block having at least one wiring strip comprising:

an insulative housing having opposed ends;

at least four electrically conductive contacts defining a first contact, a second contact, a third contact, and a fourth contact, said contacts being partially disposed in said housing, said first contact and said second contact extending through one of said ends, said third contact and said fourth contact extending through the other of said ends, said first contact and said third contact being aligned, said second contact and said fourth contact being aligned and adjacent to said first contact and said third contact; and wherein further said second and third contacts include C-shaped upper portions;

a first fuse in said housing, said first fuse being electrically connected between said first contact and said third contact; and a second fuse in said housing, said second fuse being electrically connected between said second contact and said fourth contact;

wherein said wiring block is a 110 type wiring block having two rows of connector blocks, said first contact and said second contact being matable with a connector block in a first row and said third contact and said fourth contact being matable with a connector block in a second row.

10. A protector module according to claim 9, wherein:

said housing includes a bottom; and further comprising a first voltage surge suppressor electrically connected to said third contact and a second voltage surge suppressor being electrically connected to said fourth contact; and a ground contact, said ground contact being electrically connected to said first voltage surge suppressor and said second voltage surge suppressor, said ground contact having a distal end extending through said bottom.

11. A protector module according to claim 10, further comprising:

opposed resilient tabs, said tabs outwardly extending from said ground contact; one of said tabs urging said first voltage surge suppressor against said third contact, and the other of said tabs urging said second voltage surge suppressor against said fourth contact.

12. A protector module according to claim 9, wherein:

said first contact and said third contact are parallel to said second contact and said fourth contact.

13. A protector module according to claim 9, wherein:

said housing includes four slots, two of said slots being disposed on one of said ends and receiving said first and said second contacts, the other two of said slots being disposed on the other of said ends and receiving said third and said fourth contacts.

14. A protector module according to claim 9, wherein:

said housing comprises an upper housing portion and a lower housing portion;

said lower housing portion includes opposed upwardly extending resilient arms, each of said arms having a latching surface thereon; and said upper housing portion includes opposed recessed surfaces for defeatably engaging said latching surfaces.

15. The protector module according to claim 9, wherein:

said first contact and said fourth contact include U-shaped upper portions facing inward in said housing; wherein said first fuse and said second fuse comprise cylindrically shaped fuse elements having opposed terminal ends; wherein further:

one of said terminal ends of said first fuse being retained within said U-shaped upper portion of said first contact and the other of said terminal ends of said first fuse being retained within said C-shaped upper portion of said third contact; and one of said terminal ends of said second fuse being retained within said C-shaped upper portion of said second contact and the other of said terminal ends of said second fuse being retained within said U-shaped upper portion of said fourth contact.

16. The protector module according to claim 9, wherein:
said first contact and said fourth contact include upper retaining fingers with a space therebetween, said fingers facing longitudinally inward in said housing, wherein said first fuse and said second fuse comprise cylindrically shaped fuse elements having opposed terminal ends; wherein further:
one of said terminal ends of said first fuse being retained within said upper retaining fingers of said first contact and the other of said terminal ends of said first fuse being retained within said C-shaped upper portion of said third contact; and
one of said terminal ends of said second fuse being retained within said C-shaped upper portion of said second contact and the other of said terminal ends of said second fuse being retained within said upper retaining fingers said fourth contact.

17. A protector module according to claim 9, wherein:
said housing further includes an extending portion depending from each end, one of said extending portions retaining said first contact and said second contact in spaced apart and parallel relationship, the other of said extending portions retaining said third contact and said fourth contact in spaced apart and parallel relationship.

18. A protector module according to claim 9, wherein:
said housing further includes two holes, one of said holes being aligned with said first and said third contacts, the other said hole being aligned with said second and said fourth contacts, whereby said first fuse and said second fuse may be removably inserted into said housing through said holes.

\* \* \* \* \*